455-619 AU 233 EX
PWE17 XR 3,514,706

May 26, 1970 J. DUPRAZ ET AL 3,514,706

BIPHASE SIGNALS SEQUENCE IDENTIFICATION SYSTEM

Filed Dec. 20, 1967 2 Sheets-Sheet 1

United States Patent Office 3,514,706
Patented May 26, 1970

3,514,706

BIPHASE SIGNALS SEQUENCE IDENTIFICATION SYSTEM

Jacques Dupraz and Thaddeus Hawkes, Paris, France, assignors to GSF-Compagnie Generale de Telegraphie Sans Fil, a corporation of France Filed Dec. 20, 1967, Ser. No. 692,014
Claims priority, application France, Dec. 30, 1966, 89,608
Int. Cl. H03k 5/00
U.S. Cl. 328—164 4 Claims

ABSTRACT OF THE DISCLOSURE

A system capable of restoring a sequence of biphase signals including noise. The system comprises a low pass filter and sampling means supplying samples of the filtered sequence in each half of the period of said biphase signals; comparator means are coupled to said sampling means for comparing the two samples supplied in each of said periods; generator means are coupled to said comparator means for supplying a restored sequence of said biphase signals in synchronism with a clock.

The present invention relates to the decoding of pulse coded binary information.

In the technique of long distance telemetering there often arises the problem of decoding the signals in the form of steps which are collected after demodulation at the output of a receiver. Such signals need to be reshaped because they are generally deformed or maimed during the transmission thereof. At the moment of their generation, the signals comprise a sequence of intervals of equal durations. During each interval a binary information bit is passed. In the biphase coding method, this bit is a transition between the upper and the lower levels of the step, which occurs in the middle of the interval considered. The bit is O or I, according to whether the transition is positive or negative in the centre of the interval.

At the output of the receiver a synchronizing and reshaping system is provided, for restoring the cadence of succession of biphase signals and their binary value.

The reshaping of the signals comprises a filtering operation which improves the signal-to-noise ratio but also deforms the steps forming the message. For identifying the information element, it is necessary to apply to the filtered signal an integration process or a sampling process which takes into consideration their particular form.

A known system for reshaping the filtered biphase signals consists in comparing the results of two integrations, effected, respectively, during the first and the second half of each interval. However, this method has the drawback of being sensitive to the time lag between the message timing and that derived from the synchronization system and therefore may lead to errors in the interpretation of the signals.

It is an object of the invention to avoid this drawback.

According to the invention there is provided a biphase signal sequence identification system comprising a low-pass filter having an input for receiving said sequence and an output, pulse generating means coupled to said output and having three outputs respectively supplying a first pulse train having half the period of said biphase signals and second and third pulse trains comprising respectively the odd and even pulses of said first pulse train, sampling means having a signal input coupled to said output, a control input receiving said first pulse train and a sample output; switching means having one input coupled to said sample output, two control inputs respectively receiving said second and third pulse trains and two outputs, subtractor means having two inputs coupled to said switching means outputs and an output; threshold comparator means coupled to said switching means output and having two complementary outputs, AND-gate means having first inputs coupled to said comparator means outputs, second inputs for receiving said second pulse train and two outputs; and bistable means controlled by said AND-gate means outputs for supplying a reshaped sequence of said biphase signals in synchronism with said pulse trains.

For a better understanding of the invention and to show how the same may be carried into effect reference will be made to the drawings accompanying the following description and in which.

Figure 1:
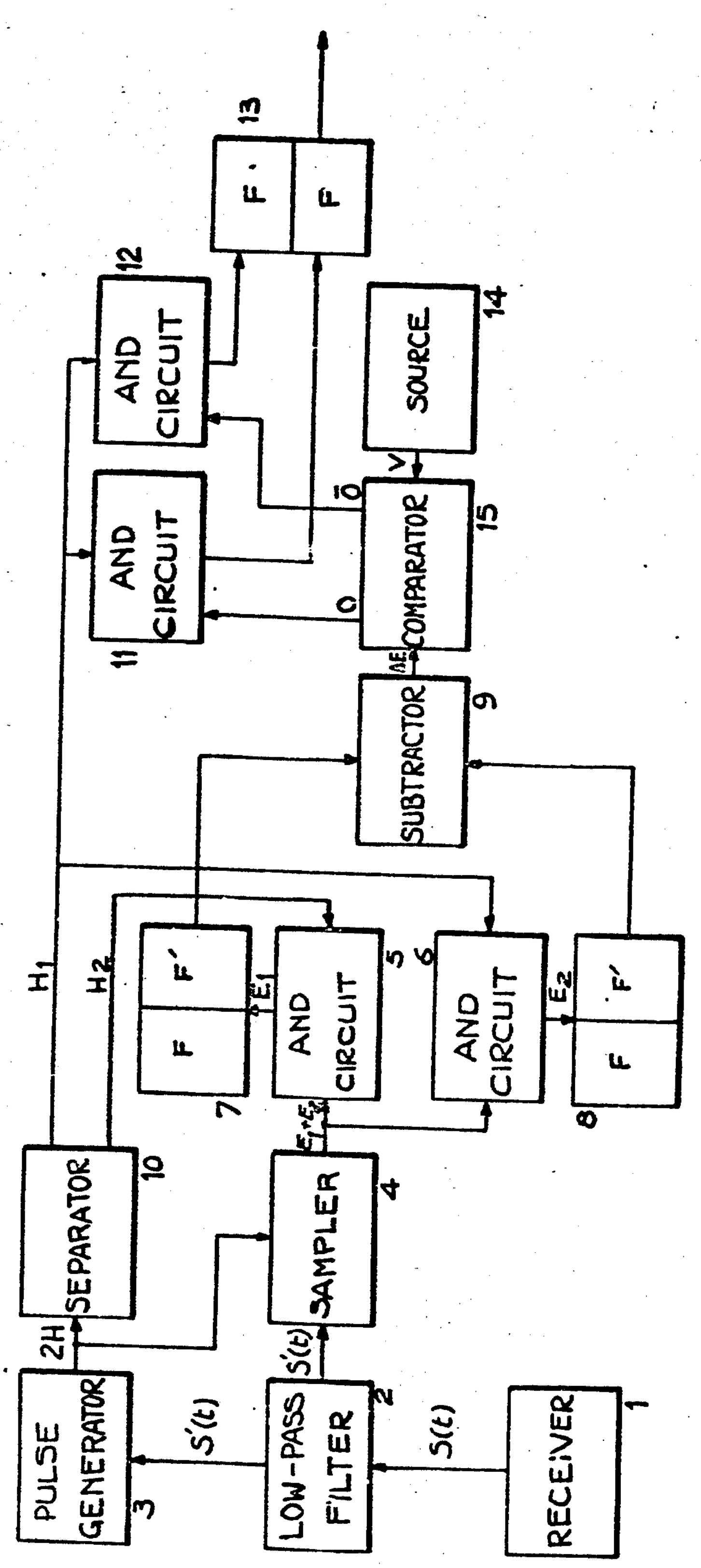
FIG. 1 is a diagram of the sampling system according to the invention.

In FIG. 1 a system for reshaping biphase signals, supplied by a receiver 1 is shown.

According to the invention, the signals $S(t)$ delivered by the receiver 1 are filtered by a low pass filter 2 whose cut-off frequency $f_c$ is equal, for example, to the reciprocal of the period T of the biphase signals. The filtered signals $S'(t)$ are applied, on the one hand, to a generator 3 of isochronous pulses, which delivers as is well known in the art a sequence of short pulses 2H at a rate double that of the signals in the sequence $S(t)$, and on the other hand, to a sampling system, comprising a sampler 4 and AND-circuits 5 and 6. The sample sequences $E_1$ and $E_2$, respectively derived from the circuits 5 and 6 are applied, respectively to bistable multivibrators 7 and 8 and the states of these multivibrators are compared by means of a subtractor 9. The sequence of pulses 2H produced by the generator 3 is divided into two sequences of pulses $H_1$ and $H_2$ by means of a separator 10 which causes them to appear alternately at its two outputs. Pulse sequences $H_1$ and $H_2$ control, respectively, the circuits 5 and 6 and the sequence $H_1$ also controls coincidence circuits 11 and 12 which control the tripping of the bistable multivibrator 13. The differential voltage $\Delta E$ delivered by the subtractor 9 is compared with a reference voltage V delivered by a source 14 by means of a threshold comparator circuit 15, whose complementary outputs O and $\overline{O}$ control, respectively, the circuits 11 and 12. The signal 2H, $H_1$ and $H_2$ have been represented as short pulses by way of non-limitative example. In fact, the pulses 2H, $H_1$ and $H_2$ may have a form differing from that shown, provided that they are synchronized with the fronts of the signals $S'(t)$.

The operation of the system of FIG. 1 is illustrated with reference to FIG. 2 which shows the wave forms encountered during the treatment of the biphase signals.

Figure 2:
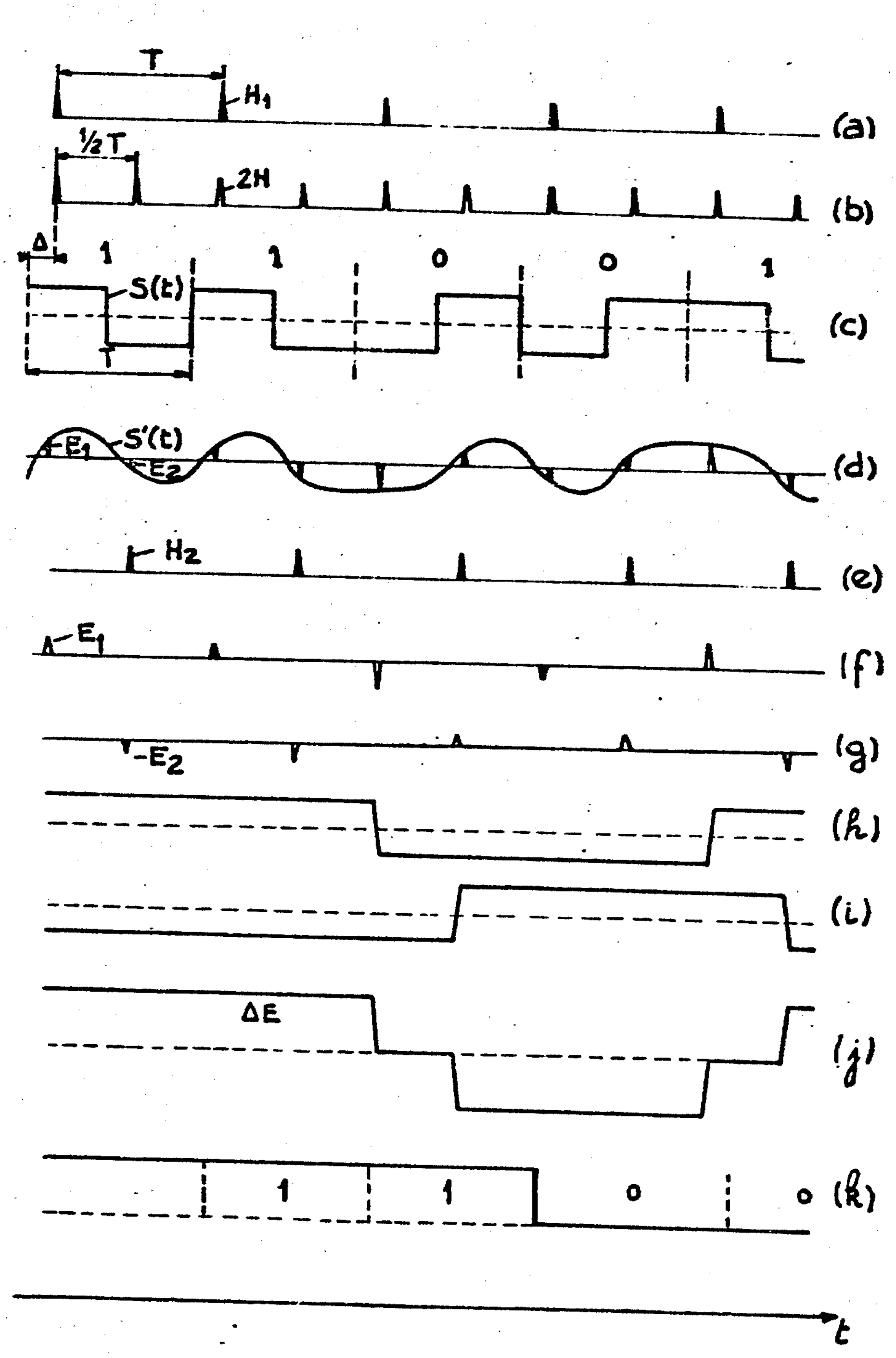
FIG. 2 is an explanatory chart.

FIG. 2 shows at *c* a sequence of biphase signals $S(t)$ with a predetermined amplitude, in the ideal form, i.e. prior to filtering and not degradated by noise. The signal period is T and there are transitions defining the binary number 11001, along the time axis $t$. At *d* the same sequence $S'(t)$ is shown filtered, as available at the output of the filter 2. The sequence $S'(t)$ controls the transmission rate of the pulses 2H shown at *b*. These pulses have a periodicity of $T/2$ and may be shifted in time relative to the sequence $S(t)$. This phase-shift, which is $\Delta$ in the case of the figure, is comprised between zero and $T/2$ and its ideal value is zero. The sequence 2H is applied to the separator 10 which supplies sequences of pulses $H_1$ and $H_2$, shown, respectively at *a* and at *e*. The sampler 4, receives the filtered sequence $S'(t)$ and the sequence 2H, and provides samples $E_1$ and $E_2$, shown in FIG. 2 at *d*. These samples are sorted by the AND-circuits 5 and 6 which supply the sequences of samples $E_1$ and $E_2$, which are shown at $f$ and $g$, respectively, in FIG. 2. The samples $E_1$ trip, upon change of polarity, the bistable multivibrator 7 whose output signal is shown at $h$ in FIG. 2. Similarly, the samples $E_2$ trip the bistable multivibrator 8 whose output signal is shown at $i$ in FIG. 2. These signals are subtracted from each other in the subtractor 9 which delivers a signal $\Delta E$, shown at $j$ in FIG. 2. The signal $\Delta E$ is compared with the reference voltage V in the comparator 15 which delivers a control signal at the output O, if the value $\Delta E$ exceeds a threshold determined by the D.C. reference voltage source 14. The complementary output $\bar{O}$ is not energized unless the output O is de-energized. Thus, one of the coincidence circuits 11 and 12 enables the pulses $H_1$ to reach one of the inputs of the bistable multivibrator 13, which is tripped in synchronization with signal $H_1$ and in accordance with the information content of the sequence $S(t)$, as shown at $k$ in FIG. 2.

Of course, the circuit of FIG. 1 is given only by way of a non-limitative example of the conditioning of biphase signals according to the invention. The invention is generally applicable to conditioning systems, using sampling in each half of the period of the filtered biphase signal and a comparison between the samples taken during the first and second half-periods. The sampling may take place in the middle of each half-period of the biphase signal and the filtering may be effected with a cut off frequency equal to the rate of the biphase signals, such characteristics not being limitative.

Of course, the invention is not limited to the embodiments described and shown which were given solely by way of example.

What is claimed, is:

1. A biphase signal sequence identification system comprising a low pass filter having an input for receiving said sequence and an output, pulse generating means coupled to said output and having three outputs respectively supplying a first pulse train having half the period of said biphase signals and second and third pulse trains comprising respectively the odd and even pulses of said first pulse train, sampling means having a signal input coupled to said filter output, a control input receiving said first pulse train and a sample output; switching means having one input coupled to said sample output, two control inputs respectively receiving said second and third pulse trains and two outputs, subtractor means having two inputs coupled to said switching means outputs and an output; threshold comparator means coupled to said subtractor means output and having two complementary outputs, AND-gate means having first inputs coupled to said comparator means outputs, second inputs for receiving said second pulse train and two outputs; and bistable means controlled by said AND-gate means outputs for supplying a reshaped sequence of said biphase signals at synchronism with said pulse trains.

2. A system as claimed in claim 1, wherein said pulse generating means comprise a pulse generator having an input coupled to said low-pass filter output and an output supplying said first pulse train; and a pulse separator having an input coupled to said pulse generator output and two outputs respectively supplying said second and third pulse trains.

3. A system as claimed in claim 1, wherein said switching means comprise a pair of AND-gates each having a first input coupled to said sample output and a second input respectively controlled by said second and third pulse trains; and two bistable circuits respectively controlled by said AND-gates.

4. A system as claimed in claim 1, wherein said threshold comparator means comprise a comparator circuit having a first input coupled to said subtractor means output and a second input coupled to a D.C. voltage source.

References Cited

UNITED STATES PATENTS

| | | | |
|---|---|---|---|
| 3,270,288 | 8/1966 | Hackett | 307—268 XR |
| 3,343,090 | 9/1967 | Den Hertog | 178—88 XR |
| 3,368,038 | 2/1968 | Ringelhaan | 178—88 |
| 3,434,059 | 3/1969 | Kesolits | 178—68 XR |

JOHN S. HEYMAN, Primary Examiner

J. ZAZWORSKY, Assistant Examiner

U.S. Cl. X.R.

178—68, 88; 307—261, 268; 340—347

PO-1050
(5/69)

UNITED STATES PATENT OFFICE
CERTIFICATE OF CORRECTION

Patent No. 3,514,706 Dated May 26, 1970

Inventor(s) Jacques Dupraz and Thaddeus Hawkes

It is certified that error appears in the above-identified patent and that said Letters Patent are hereby corrected as shown below:

The name of the assignee appearing in column 1 should be changed to read as follows:

-- CSF - Compagnie Generale de Telegraphie Sans Fil--

SIGNED AND SEALED

OCT 27 1970

(SEAL)
Attest:

Edward M. Fletcher, Jr.
Attesting Officer

WILLIAM E. SCHUYLER, JR.
Commissioner of Patents